United States Patent [19]
Sutliff et al.

[11] Patent Number: 5,491,962
[45] Date of Patent: Feb. 20, 1996

[54] CUTTING HEAD ASSEMBLY

[75] Inventors: James W. Sutliff, Remsen; Dallas W. Jones, New Hartford; Lawrence J. Kuhl, Syracuse, all of N.Y.

[73] Assignee: Trim-A-Lawn Corporation, Utica, N.Y.

[21] Appl. No.: 153,777

[22] Filed: Nov. 17, 1993

[51] Int. Cl.⁶ ................................................ A01D 34/73
[52] U.S. Cl. .......................................... 56/12.7; 56/295
[58] Field of Search ................................. 56/12.7, 17.2, 56/255, 295

[56] References Cited

U.S. PATENT DOCUMENTS

| | | | |
|---|---|---|---|
| D. 309,311 | 7/1990 | Jones et al. | D15/17 |
| D. 309,903 | 8/1990 | Jones et al. | D15/17 |
| 2,547,540 | 4/1951 | Roberts | 56/255 |
| 2,697,322 | 12/1954 | Watrous | 56/295 |
| 2,916,867 | 12/1959 | Chadwick | 56/295 |
| 3,176,455 | 4/1965 | Buchanan | 56/295 |
| 3,184,903 | 5/1965 | Fjelstad | 56/17.5 |
| 3,203,161 | 8/1965 | Breisch et al. | 56/295 |
| 3,563,014 | 2/1971 | Krewson | 56/17.5 |
| 3,643,408 | 2/1972 | Kulak et al. | 56/295 |
| 3,693,335 | 9/1972 | Mathews | 56/294 |
| 3,959,955 | 6/1976 | Smith et al. | 56/17.5 |
| 4,107,841 | 8/1978 | Rebhun | 30/276 |
| 4,126,991 | 11/1978 | Gobin et al. | 56/295 |
| 4,202,094 | 5/1980 | Kalmar | 56/12.7 X |
| 4,270,271 | 6/1981 | Feldman | 56/12.7 X |
| 4,313,297 | 2/1982 | Maier | 56/295 |
| 4,374,465 | 2/1983 | Comer | 56/12.7 |
| 4,571,831 | 2/1986 | White, III | 30/276 |
| 4,819,416 | 4/1989 | Jones | 56/12.7 |
| 4,854,115 | 8/1989 | Jones et al. | 56/320.1 |
| 4,894,980 | 1/1990 | Jones et al. | 56/320.1 |
| 4,905,465 | 3/1990 | Jones et al. | 56/295 |
| 4,909,024 | 3/1990 | Jones et al. | 56/16.7 |
| 4,962,630 | 10/1990 | Jones | 56/12.7 |
| 4,962,635 | 10/1990 | Jones et al. | 56/12.7 |
| 4,996,828 | 3/1991 | Jetzinger | 56/295 X |
| 5,048,278 | 9/1991 | Jones et al. | 56/295 |
| 5,123,236 | 6/1992 | Bablitz | 56/17.5 |

FOREIGN PATENT DOCUMENTS

| | | | |
|---|---|---|---|
| 489256 | 6/1977 | Australia | 56/295 |
| 1285774 | 7/1991 | Canada . | |
| 2370419 | 7/1978 | France | 56/295 |
| 2818137 | 11/1979 | Germany | 56/295 |
| 3332183 | 9/1983 | Germany . | |

*Primary Examiner*—David J. Bagnell
*Attorney, Agent, or Firm*—Heslin & Rothenberg

[57] ABSTRACT

The invention provides a cutting head assembly for a lawnmower, trimmer, or similar device which includes a plurality of lower cutting elements mounted to a disc-shaped support member. A plurality of upper cutting elements are also mounted to the disc-shaped support member at a higher elevation, such that each upper cutting element is directly above a corresponding lower cutting element. This allows for a double cut mulching effect in use. An air foil can be provided with the upper cutting elements to create an upward vacuum which positions the grass for a clean cut by both the upper and lower cutting elements. The cutting elements can comprise cutting blades and/or flexible cutting filaments.

35 Claims, 3 Drawing Sheets

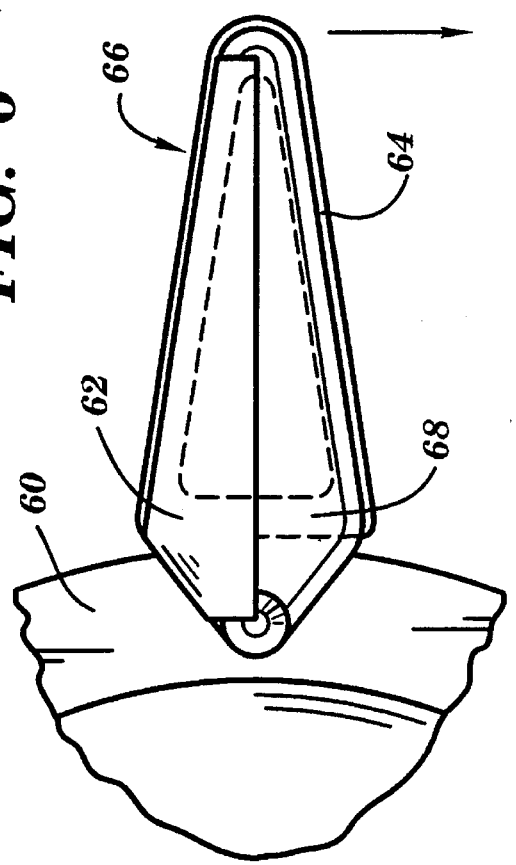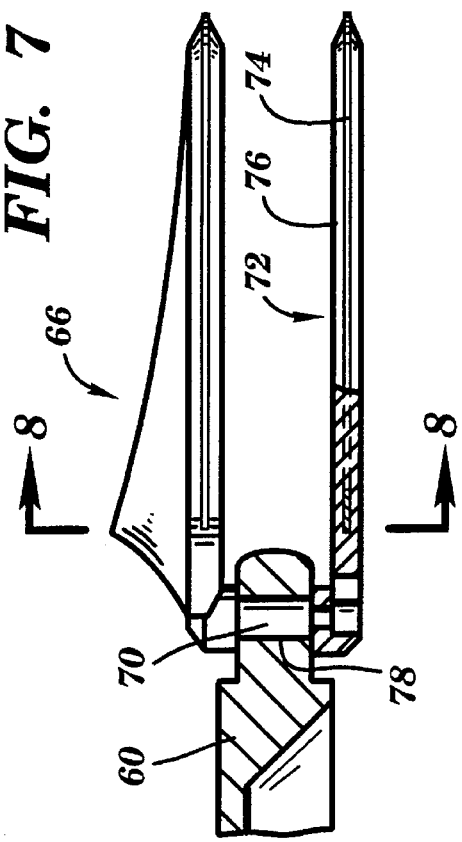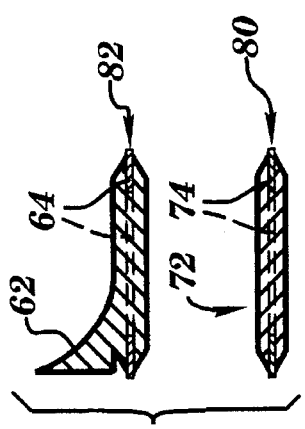

CUTTING HEAD ASSEMBLY

FIELD OF THE INVENTION

This invention relates in general to a cutting head assembly for a lawnmower, trimmer, or similar device, and more particularly to a cutting head which includes a plurality of lower cutting elements mounted to a disc-shaped support member at one elevation, and another plurality of upper cutting elements mounted to the disc-shaped support member at a higher elevation, so as to provide a double cut mulching effect. Each upper cutting element is mounted directly over a corresponding lower cutting element.

BACKGROUND OF THE INVENTION

It is well known that conventional lawnmowers have the potential to inflict great bodily harm or loss of life to the operator or bystander. The metal cutting blade customarily used in lawnmowers can permanently disfigure or injure the operator or an innocent bystander.

To make the lawnmower safer to use, flexible cutting filaments (more commonly used with trimmers) have been used to replace the standard metal blades. Use of flexible cutting filaments, however, has resulted in a tear of the grass vegetation rather than a clean cut because flexible cutting filaments are typically round. This problem has been addressed somewhat by the introduction of flexible cutting filaments with a triangular cutting edge. These triangular filaments tend to give a more even cut. However, the rotary members used for holding the flexible cutting filaments typically include rigid arms or projections which have the potential of hurting or injuring an unwary operator or bystander.

Accordingly, a need continues to exist for an efficient and safe cutting head for a lawnmower, trimmer, or similar device. With the recent emphasis on mulching so as to reduce grass clipping debris being taken to landfills, it is desirable that the cutting head also provide a form of mulching.

SUMMARY OF THE INVENTION

These needs are met by the cutting head assembly according to the subject invention. The main components of the cutting head assembly include a disc-shaped support member to which are mounted a first plurality of lower cutting elements and a second plurality of upper cutting elements. The second plurality of upper cutting elements are mounted at the circumference of the disc-shaped support member, extending therefrom, so that each is directly above a corresponding one of the first plurality of lower cutting elements. Each of the first plurality of lower cutting elements is also mounted at the circumference of the disc-shaped support member, extending therefrom.

Preferably, the lower cutting elements are mounted to the disc-shaped support member in a horizontal plane below the bottom surface of the disc-shaped support member. This helps to prevent damage to the cutting head assembly caused by obstructions, since the lowest point of the assembly is the lower cutting elements. The cutting elements, upper and lower, are pivotably mounted via a common post so that the cutting elements can pivot in response to any obstruction and then bounce back to their proper position. This ability to pivot in response to an obstruction also helps to prevent obstructions from being thrown from the lawnmower/trimmer as dangerous projectiles.

Various embodiments of the cutting head assembly are provided, depending in part upon the utilization of the assembly. In a lawnmower application of the cutting head assembly, both the first plurality and the second plurality of cutting elements comprise cutting blades. The cutting blades are formed by mounting a thin metal blade within a plastic housing, with a small portion of the metal blade extending from the housing at the cutting surface thereof. This thin metal insert in the plastic housing allows the clean cut of a conventional metal blade, but the small amount of exposed metal reduces the danger to the operator thereof. In order to provide a lifting force to keep the grassy vegetation being cut upright, an air foil is provided on the upper cutting blades. Each lower cutting blade can be provided with one or more apertures extending vertically therethrough, which optimize the upward draft created by the air foils as discussed further below. Each cutting blade, upper and lower, is also provided with an angular cutting surface (due to the triangular shape of the cutting element), which helps facilitate a clean cut of grassy vegetation. If the lawnmower is to be used in a trimming application, optional flexible cutting filaments are attached to each of the upper cutting blades. The flexible cutting filaments extend beyond the end of the cutting blades and can be used to trim and further mulch the vegetation.

A further embodiment is also provided which is designed specifically for trimming applications. In this embodiment, the upper cutting elements comprise flexible cutting filaments that extend beyond the ends of the lower cutting blades, again for use in trimming and mulching the grassy vegetation. To provide a lifting force to keep the grassy vegetation being cut upright, the flexible cutting filaments can be attached via air foils. The air foils also serve as balancing members in that the weight of the upper air foils counterbalances the weight of the lower cutting blades.

Having thus summarized the subject invention, some of the objectives of the invention are as follows. It is an object of the invention to provide an improved cutting head assembly for use with lawnmowers, trimmers, and the like.

It is a further object to provide a cutting head assembly with easily removable cutting elements, including flexible cutting filaments and cutting blades, for easy replacement or sharpening.

It is another object to provide a cutting head assembly which reduces the danger of bodily harm associated with conventional steel blade lawnmowers which readily throw projectiles from the lawnmower.

It is an additional object to provide a cutting head assembly which creates an upward vacuum to provide even cutting of grassy vegetation.

It is yet another object of the invention to provide a cutting head assembly which provides for mulching of grassy vegetation.

It is another object of the invention to provide such a cutting head assembly that is aerodynamic so as to minimize the energy drain required to operate the cutting head assembly.

It is yet another object of the invention to provide such a cutting head assembly that does not require tools to assemble or disassemble and minimizes wear of the plastic disc-shaped member while maximizing support of said plastic disc-shaped member to the motor shaft.

BRIEF DESCRIPTION OF THE FIGURES

These and other objects, features and advantages of this invention will be evident from the following detailed

Figure 1:
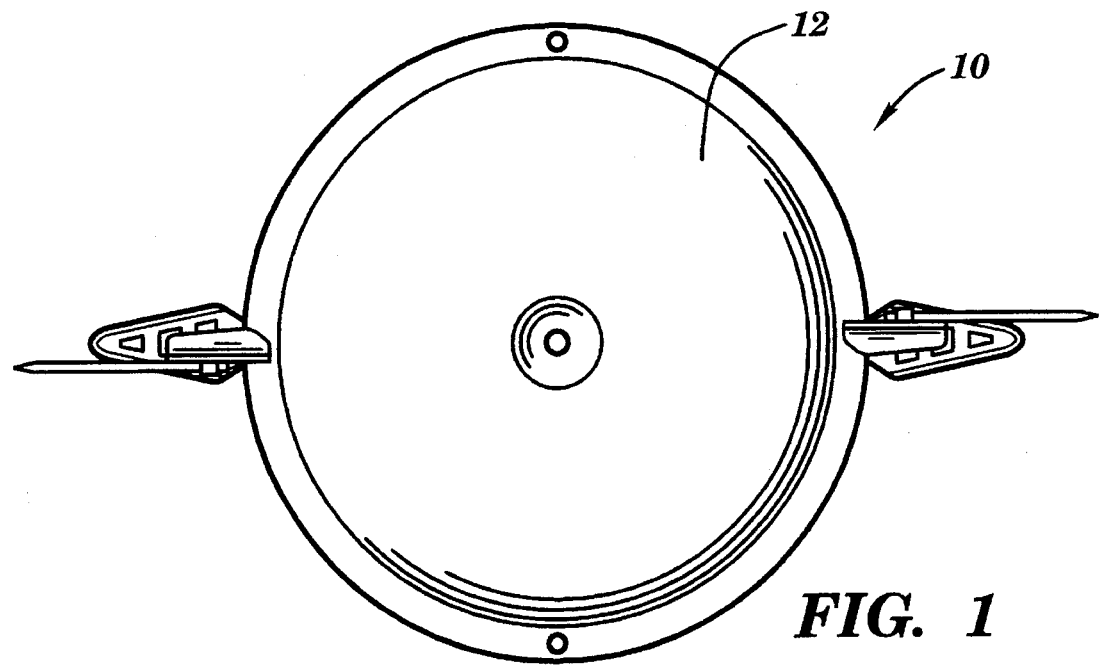
Figure 2:
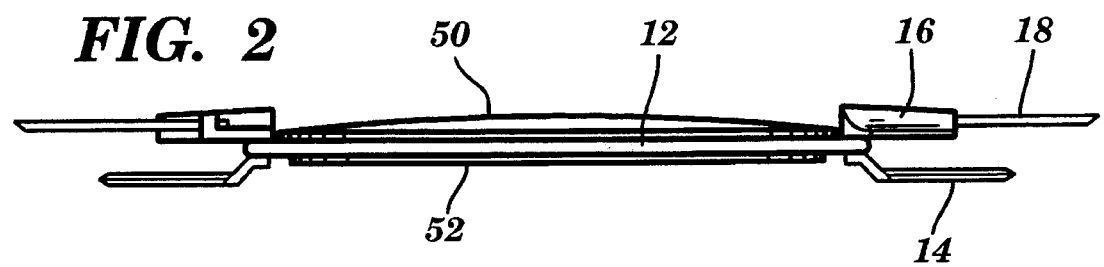
Figure 3:
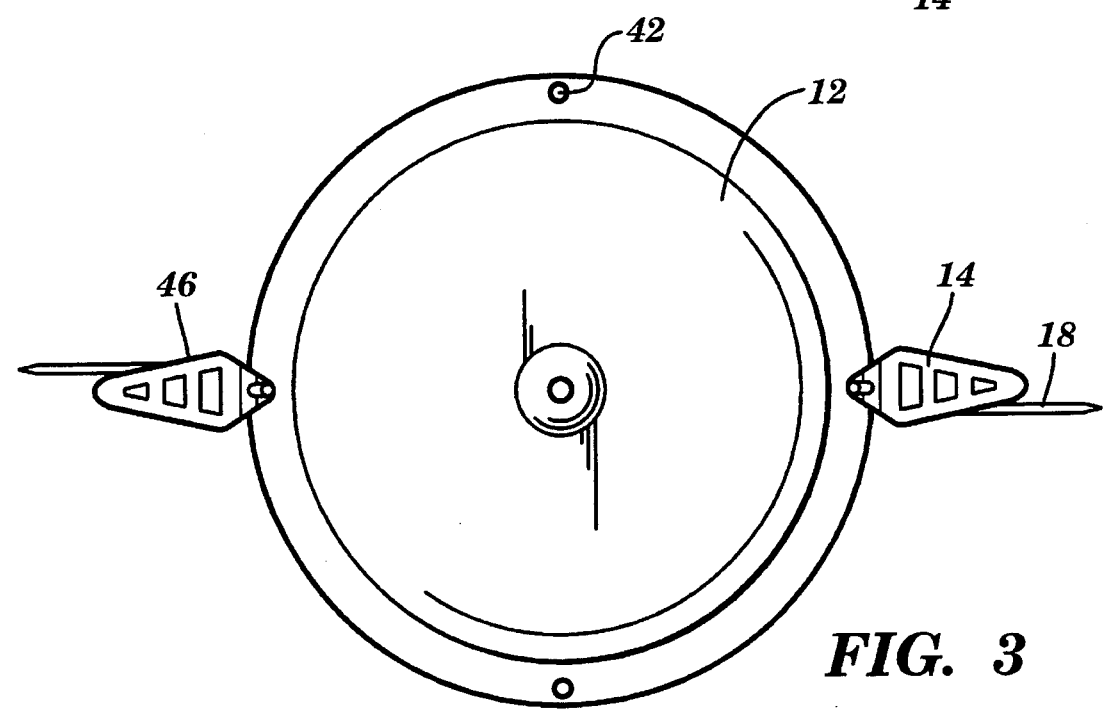
Figure 4:
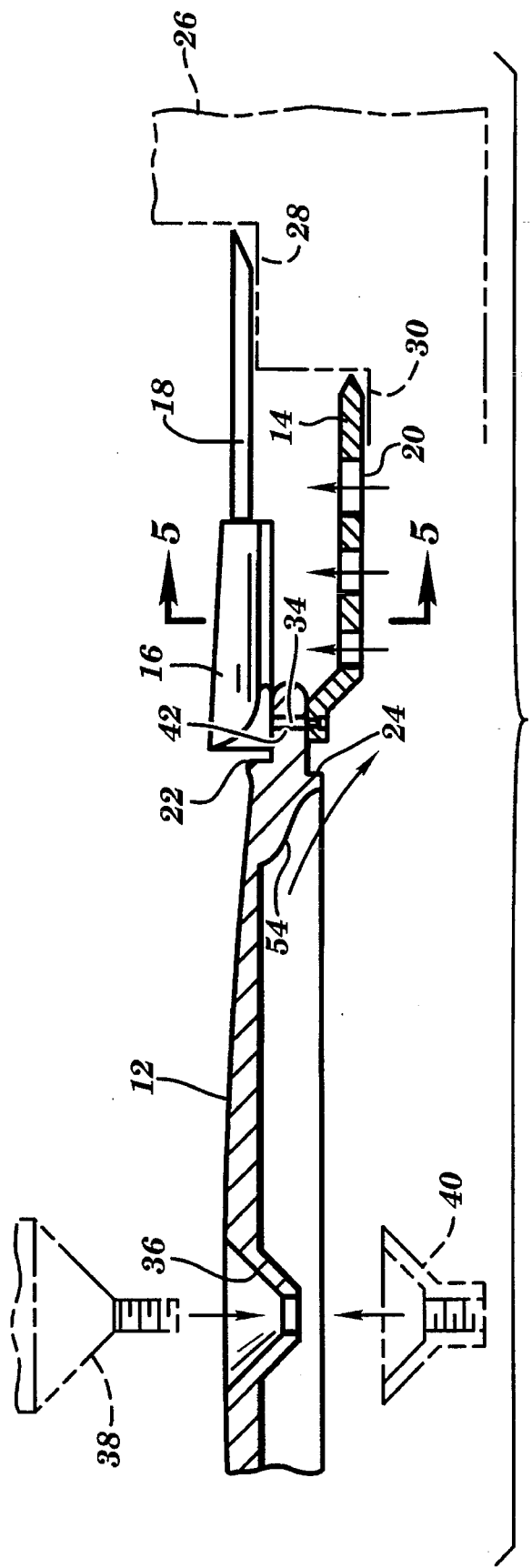
Figure 5:
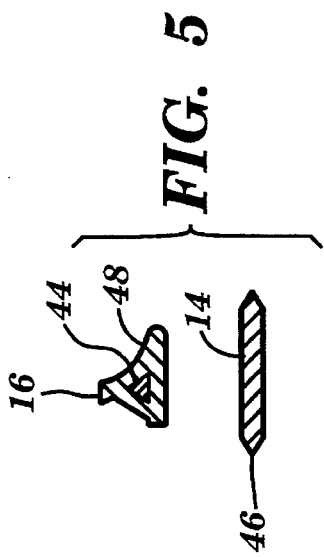

3 description of preferred embodiments when read in conjunction with the accompanying drawings in which:

FIG. 1 is a top view of one embodiment of a cutting head assembly according to the subject invention;

FIG. 2 is a side view of the cutting head assembly shown in FIG. 1;

FIG. 3 is a bottom view of the cutting head assembly shown in FIG. 1;

FIG. 4 is a partial cross-sectional side view of a portion of the cutting head assembly shown in FIG. 2, illustrating the attachment of the cutting head assembly to a shaft and the attachment of the air foil, flexible cutting filament, and cutting blade;

FIG. 5 is a cross-sectional end view taken at 5—5 of the air foil and cutting blade shown in FIG. 4;

FIG. 6 is a top view of a portion of a further embodiment of a cutting head assembly according to the subject invention;

FIG. 7 is a partial cross-sectional side view of the cutting head assembly shown in FIG. 6, illustrating the attachment of the upper cutting blade with an air foil and the lower cutting blade; and FIG. 8 is a cross-sectional end view taken at 8—8 of the upper cutting blade with the air foil and the lower cutting blade shown in FIG. 7.

DETAILED DESCRIPTION OF THE INVENTION

One embodiment of the cutting head assembly according to the subject invention designed particularly for use in a trimming application is shown in FIGS. 1–5. Referring to FIGS. 1–3, the cutting head assembly 10 includes a disc-shaped support member 12 having a top surface 50 and a bottom surface 52. Mounted about the circumference of the disc-shaped support member 12 are an air foil 16, a flexible cutting filament 18, and a cutting blade 14. Two sets of these elements are shown mounted to the disc-shaped support member 12 via apertures 42 in the circumference of the disc-shaped support member 12. Additional apertures and sets of these elements can be provided according to the desired density of cutting blades and filaments. Referring to FIG. 2, it is apparent that in this embodiment the flexible cutting filament 18 is connected to the air foil 16, both of which are mounted above a corresponding cutting blade. The flexible cutting filament 18 also extends a greater distance from the disc-shaped support member 12 than does the cutting blade 14. The horizontal plane in which the cutting blade 14 lies is the lowest elevation of the cutting head assembly 10 (relative to the grassy vegetation being cut).

The attachment of the air foil 16, flexibile cutting filament 18, and cutting blade 14 to the disc-shaped support member 12 is best shown in FIG. 4. As shown therein, a post 34 extends from the air foil 16 through the aperture 42 in the circumference of the disc-shaped support member 12. This post 34 can be integral with the air foil 16 or be a separate element to which the air foil 16 is attached. One end of the post 34 extends from the aperture 42 toward the bottom surface 52 of the disc-shaped support member 12. To this end of the post 34 the cutting blade 14 is attached. Attachment can be by any suitable means, such as a snap-fit. The other end of the post 34 extends from the aperture 42 toward the top surface 50 of the disc-shaped support member 12. To this end of the post 34 the air foil 16 is attached by suitable

4 means. The flexible cutting filament 18 is attached to the air foil 16 by positioning one expanded end of the flexible cutting filament 18 in a channel 44 in the air foil 16 (see FIG. 5). The diameter of the expanded end (which can be formed merely by melting the end and allowing it to harden with a diameter larger than the original unmelted filament) is too large to travel through the channel 44, therefore the flexible cutting filament 18 will not be expelled from the air foil 16 when the cutting head assembly is rotating.

Referring again to FIG. 4, the aerodynamics of the cutting head assembly are illustrated. The air foil 16 comprises a wedge-shaped member, with the leading edge 48 (see FIG. 5) of the air foil creating an upward draft or vacuum which will lift the grassy vegetation to be cut. This upward draft or vacuum is further facilitated by the apertures 20 in the cutting blade 14, which allow the flow of air vertically upward through the lower cutting blades.

Two features of the cutting blade 14 also help to facilitate a clean cut of grassy vegetation. The first is the angular cutting surface 46 of the cutting blade 14 (shown in FIG. 3), and the second is the positioning of the cutting surface 46 at the center (vertically) of the cutting blade 14 (shown in FIG. 5).

Several features of the disc-shaped support member 12 also add to the ability of the cutting head assembly to operate easily. This is especially important when the cutting head assembly is utilized on a battery-operated lawnmower/trimmer, since the conservation of battery power is a key to longer operation of the lawnmower/trimmer without recharging. The first feature is the lip 22 which is angled to expel any debris over the air foil 16 without allowing significant accumulation of debris on the cutting head assembly. The second feature is the lip 24 which is angled to expel any debris over the cutting blade 14, and particularly over the attachment point of the cutting blade to the post. This prevents accumulation of debris on the post which is the pivot point for the cutting blade and the air foil. The inner surface 54 of the disc-shaped support member 12 at its outer circumference is also angled to facilitate the expulsion of debris from the cutting head assembly.

For operation of the cutting head assembly, especially with battery-operated lawnmowers/trimmers, it is critical to reduce any unnecessary vibration or chattering of the cutting head elements. This is accomplished in part by the means utilized to attach the cutting head assembly to a lawnmower/trimmer. Referring to FIG. 4, the threaded shaft 38 of the lawnmower/trimmer is altered to include a cone-shaped extension thereon. A corresponding cone-shaped indentation 36 is provided in the top surface of the disc-shaped support member 12. The disc-shaped support member 12 is thus securely self-aligned on the shaft 38, and is held in place by a corresponding cone-shaped nut 40. Each of the shaft 38 and the nut 40 are generally made of metal, while the disc-shaped support member 12 is preferably made of plastic. The self alignment of the disc-shaped support member between the metal shaft and the metal nut, with the angular dimensions of the cone-shapes, helps to prevent wobbling of the disc-shaped support member, and also helps to prevent warping of the plastic support member due to heat generated by rotation or spinning of the shaft 38.

To facilitate use of the cutting head assembly with battery-operated devices, where the conservation of power is important, it is preferred that the elements of the cutting head assembly have the lowest mass possible. Thus, it is preferably that the disc-shaped support member, the cutting blade, the air foil, the flexible cutting filament, and even the post be made of plastic material. This also facilitates manufacturing of the components since they can be readily molded. Though plastic is the preferred material for the above-named elements, those skilled in the art will recognize that many other materials are available for the manufacture of these elements.

In operation, the cutting head assembly 10 is mounted to a shaft 38 of a lawnmower/trimmer, as shown in FIG. 4. The lawnmower/trimmer is turned on, and the cutting head assembly rotates at high revolutions per minute (rpm). Assuming grassy vegetation at a height 26 (see FIG. 4), the flexible cutting filament 18 cuts the grassy vegetation first at elevation 28. The cutting blade 14, which does not extend as far away from the disc-shaped support member 12, then provides a second cut of the grassy vegetation at elevation 30. Thus, in effect, the cutting head assembly is providing a mulching effect since the grass is being cut into smaller pieces than can be accomplished with a conventional lawnmower/trimmer. During this operation, the vacuum created by the air foil 16 and the facilitation of the upward draft by the apertures 20 in the cutting blade help to lift the grass for a clean and even cut.

In the event that an object of appreciable mass is encountered by either the flexible cutting filament or the cutting blade, each of these elements is pivotably mounted to the disc-shaped support member via the post. This allows each of the cutting blade and the flexible cutting filament to pivot if a large mass object is encountered, decreasing the chance that the object will be thrown from the lawnmower/trimmer as a dangerous projectile. The centrifugal force caused by rotation of the cutting head assembly will bring each of the elements back to their proper position after impact with any object, again due to the pivotable attachment.

A further embodiment of the subject invention is shown in FIGS. 6–8. This embodiment is designed particularly for use in a lawnmowing application. The flexible cutting filament/ air foil on the upper surface of the disc-shaped support member 60 has been replaced with an upper cutting blade 66 which comprises a plastic housing 68 into which is insert molded a thin metal blade 64. The edges of the metal blade 64 extend from the plastic housing 68 to provide a cutting edge, but do not extend so far as to present a great danger to an operator thereof. A wedge-shaped air foil 62 is mounted to the plastic housing 68 as shown, and for ease in manufacture the air foil 62 can be integral with the plastic housing 68.

Referring to FIG. 7, the upper cutting blade 66 includes a post 70 integral therewith which extends through an aperture 78 in the disc-shaped support member 60. The lower cutting blade 72 is attached to the lower end of the post 70 by suitable means, such as a snap-fit. This lower cutting blade 72 is designed similarly to the upper cutting blade 66 in that it includes a plastic housing 76 into which is inserted a metal blade 74 to provide a cutting edge.

The cutting edge 82 of the upper cutting blade is shown in FIG. 8, in relation to the air foil 62 and the metal blade 64. Likewise, the cutting edge 80 of the lower cutting blade 72 is shown in relation to the metal blade 74.

The disc-shaped support member and its attachment to a lawnmower/trimmer is the same as was described in the previous embodiment. Operation is also the same, with the upper cutting blade providing a cut at a higher elevation than the lower cutting blade.

In a further embodiment, a flexible cutting filament could be attached to the upper cutting blade having the air foil in a manner as described above for the first embodiment. This would add a trimming capability to the lawnmower application.

It should be readily apparent that various blade and/or flexible cutting filament combinations can be utilized according to the subject invention. The placement of one upper cutting element directly above a corresponding lower cutting element allows for a double-cut mulching effect utilizing the cutting head assembly in either a lawnmower or a trimmer application. The use of a post to attach the cutting elements in a pivotable manner reduces the hazards associated with use of the cutting head assembly, because the cutting elements pivot in response to contact with an object of appreciable mass.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined by the following claims.

What is claimed is:

1. A cutting head assembly comprising:
   a disc-shaped support member having a top surface and a bottom surface;
   a first plurality of lower cutting elements mounted about the circumference of said disc-shaped support member and extending therefrom; and
   a second plurality of upper cutting elements mounted about the circumference of said disc-shaped support member and extending therefrom, wherein during operation of said cutting head assembly, at least one of said second plurality of upper cutting elements defines a notional cutting plate which is substantially parallel to a notional cutting plate defined by at least one of said first plurality of lower cutting elements.

2. The cutting head assembly of claim 1 wherein each of said first plurality of lower cutting elements comprises a cutting blade.

3. The cutting head assembly of claim 2, wherein each of said second plurality of upper cutting elements comprises a draft inducing cutting blade.

4. The cutting head assembly of claim 3 further comprising a flexible cutting filament mounted to each of said draft inducing cutting blades and extending therefrom.

5. The cutting head assembly of claim 2 wherein each of said second plurality of upper cutting elements comprises a flexible cutting filament.

6. The cutting head assembly of claim 5 wherein said flexible cutting filaments extend from said disc-shaped support member a greater distance than said cutting blades.

7. The cutting head assembly of claim 2, wherein said second plurality of upper cutting elements comprises a plurality of balancing members mounted about the circumference of said disc-shaped support member, wherein each of said plurality of balancing members is mounted above a corresponding one of said cutting blades.

8. The cutting head assembly of claim 7 wherein said balancing member comprises an air foil.

9. The cutting head assembly of claim 8 wherein said air foil comprises a wedge-shaped member.

10. The cutting head assembly of claim 8 wherein said second plurality of upper cutting elements further comprises a flexible cutting filament mounted to at least one of said plurality of balancing members.

11. The cutting head assembly of claim 1 wherein said notional cutting plate defined by said at least one of said first plurality of lower cutting elements is planar and is disposed below and parallel to a horizontal plane of the bottom surface of said disc-shaped support member.

12. The cutting head assembly of claim 1 wherein said first plurality of lower cutting elements are mounted to said bottom surface of said disc-shaped support member.

13. The cutting head assembly of claim 12 wherein said second plurality of upper cutting elements are mounted to said top surface of said disc-shaped support member.

14. The cutting head assembly of claim 1 wherein each of said first plurality of lower cutting elements has apertures therein to allow flow of air vertically therethrough.

15. The cutting head assembly of claim 1 wherein said disc-shaped support member has a plurality of apertures about the circumference thereof.

16. The cutting head assembly of claim 15 wherein each of said first plurality of lower cutting elements is mounted to said disc-shaped support member at a corresponding one of said plurality of apertures.

17. The cutting head assembly of claim 16 further comprising a post mounted in each of said plurality of apertures, wherein each of said first plurality of lower cutting elements is connected to one end of a post mounted in said corresponding one of said plurality of apertures, said one end extending from said aperture toward the bottom surface of said disc-shaped support member.

18. The cutting head assembly of claim 17 wherein said corresponding one of said second plurality of upper cutting elements is connected to the other end of said post, said other end extending from said aperture toward the top surface of said disc-shaped support member.

19. The cutting head assembly of claim 17 further comprising a balancing member mounted to the other end of said post, said other end extending from said aperture toward said top surface of said disc-shaped support member.

20. The cutting head assembly of claim 1 wherein each of said first plurality of lower cutting elements has a cutting surface disposed at an oblique angle relative to a tangential component of movement of said first plurality of cutting elements during operation of said cutting head assembly.

21. The cutting head assembly of claim 1 wherein said first plurality of lower cutting elements are pivotably mounted to said disc-shaped support member.

22. The cutting head assembly of claim 1 wherein said second plurality of upper cutting elements are pivotably mounted to said disc-shaped support member.

23. The cutting head assembly of claim 1 wherein said disc-shaped support member includes means for mounting said disc-shaped support member to a shaft.

24. The cutting head assembly of claim 23 wherein said means for mounting comprises a cone-shaped indentation in the center of the top surface of said disc-shaped support member for receiving a correspondingly cone-shaped extension of the shaft.

25. The cutting head assembly of claim 1 wherein at least two of the disc-shaped support member, the first plurality of lower cutting elements and the second plurality of upper cutting elements are formed substantially from plastic.

26. The cutting head assembly of claim 25 wherein all of the disc-shaped support member, the first plurality of lower cutting elements and the second plurality of upper cutting elements are formed substantially from plastic.

27. The cutting head assembly of claim 1 further comprising a snap-fit coupling to attach at least one cutting element of the first plurality of lower cutting elements or the second plurality of upper cutting elements to the disc-shaped support member.

28. The cutting head assembly of claim 1, wherein each of said second plurality of upper cutting elements is mounted directly above a corresponding one of said first plurality of lower cutting elements.

29. A cutting head assembly comprising:

a disc-shaped support member having a top surface and a bottom surface;

a first plurality of lower cutting elements mounted about the circumference of said disc-shaped support member and extending therefrom;

a second plurality of upper cutting elements mounted about the circumference of said disc-shaped support member and extending therefrom;

each of said first plurality of lower cutting elements comprising a cutting blade;

said cutting blade having a plastic housing with a cutting surface thereon; and a metal blade inserted within said plastic housing, a portion of said metal blade extending from said plastic housing at said cutting surface.

30. A cutting head assembly comprising:

a disc-shaped support member having a top surface and a bottom surface;

a first plurality of lower cutting elements mounted about the circumference of said disc-shaped support member and extending therefrom;

a second plurality of upper cutting elements mounted about the circumference of said disc-shaped support member and extending therefrom;

each of said first plurality of lower cutting elements comprising a cutting blade;

said second plurality of upper cutting elements comprising a draft inducing cutting blade which comprises a plastic housing having a cutting surface thereon; a metal blade inserted within said plastic housing, a portion of said metal blade extending from said plastic housing at said cutting surface; and an air foil mounted to said plastic housing.

31. A cutting head assembly comprising a disc-shaped support member having a top surface and a bottom surface; a plurality of cutting elements mounted about the circumference of said disc-shaped support member and extending therefrom; wherein the top surface of the disc-shaped support member has a circular lip projecting therefrom, the circular lip being centered on said top surface and positioned at a radius inside of the circumference of the disc-shaped support member, the circular lip for expelling debris generally away from the circumference of the disc-shaped support member.

32. A cutting head assembly comprising a disc-shaped support member having a top surface and a bottom surface; a plurality of cutting elements mounted about the circumference of said disc-shaped support member and extending therefrom; wherein the bottom surface of the disc-shaped support member comprises a circular angled surface having an inner radius and an outer radius, the outer radius being inside of the circumference of the disc-shaped support member, the angled surface being centered within said bottom surface and extending outwardly and downwardly from the inner radius to the outer radius, the circular angled surface for expelling debris away from the cutting head assembly.

33. The cutting head assembly of claim 32 wherein the circular angled surface has a circular lip projecting therefrom proximate the outer radius, the circular lip for expelling debris generally away from the circumference of the disc-shaped support member.

34. A cutting head assembly comprising:

a support member;

at least one cutting blade pivotably disposed thereon;

said at least one cutting blade including a plastic housing having a cutting surface; and a metal blade inserted within said plastic housing, a portion of said metal blade extending from said plastic housing at said cutting surface.

35. A plastic cutting assembly for rotational vegetation cutting comprising a cone-shaped indentation in the center thereof for receiving a correspondingly cone-shaped extension of a shaft for mounting the plastic cutting assembly to the shaft.

* * * * *